UNITED STATES PATENT OFFICE.

JOHANN JAKOB BRACK, OF BASLE, SWITZERLAND, ASSIGNOR TO BASLE CHEMICAL WORKS, OF SAME PLACE.

RED RHODAMIN DYE.

SPECIFICATION forming part of Letters Patent No. 643,371, dated February 13, 1900.

Application filed November 28, 1899. Serial No. 738,568. (Specimens.)

*To all whom it may concern:*

Be it known that I, JOHANN JAKOB BRACK, chemist, a citizen of the Swiss Republic, residing at Basle, Switzerland, have invented a new Rhodamin Dye, of which the following is a clear and complete specification.

In Letters Patent No. 584,119, dated June 8, 1897, an alkyl ether of the unsymmetrical dimethyl-methylrhodamin derived from dimethylamidoöxybenzoylbenzoic acid and metaämidoparacresol ($CH_3:NH_2:OH=1:2:4$) is described. I have now found that by condensing two molecules of the said ether with one molecule of formic aldehyde a new dyestuff is obtained dyeing tannin-mordanted cotton in fiery-red tints. This new dyestuff probably has the following constitutional formula:

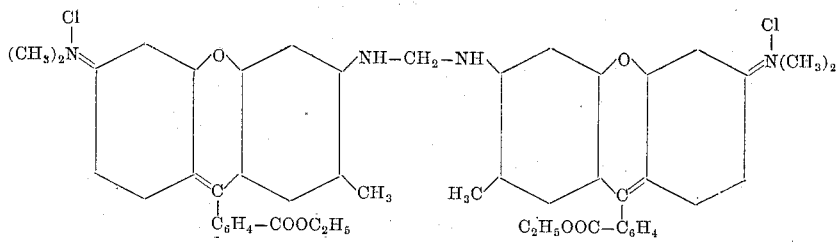

The new dyestuff may be prepared as follows: To a solution of thirty kilos of the ethyl ether of the unsymmetrical dimethyl-methylrhodamin derived from dimethylamidoöxybenzoylbenzoic acid and metaämidoparacresol ($CH_3:NH_2:OH=1:2:4$) in two hundred kilos sulfuric acid of 66° Baumé I add a mixture of two kilos formic aldehyde of forty per cent. and thirty kilos sulfuric acid of 66° Baumé. The reaction sets in at once and is marked by a rise of the temperature of the solution. To complete the reaction, I allow the solution to stand for twelve hours at the ordinary temperature, and afterward I pour it on ice. The sulfate of the product of condensation precipitates nearly entirely as a dark-brown-red granulous mass. To convert this sulfate into chlorid, I dissolve the former in one hundred kilos of alcohol and one hundred and thirty kilos of water and add to the hot solution sixty kilos of hydrochloric acid of 20° Baumé. After cooling, water is poured in while stirring, whereby the chlorid is nearly entirely separated as dark-red precipitate, which is separated by filtration and dried.

In its dry state the new dyestuff appears as a red-brown powder, which dissolves in hot water and alcohol. It dyes tannin-mordanted cotton in fiery-red tints, which are yet bluer than those obtained with the material at starting. Its solution in hot water is crimson red and shows no fluorescence, differing in this respect from the material at starting.

In concentrated sulfuric acid the dyestuff dissolves with an orange tint, which turns to crimson red by addition of water.

By addition of water to a solution of the dyestuff in concentrated sulfuric acid a dark-red precipitate separates after a short time from the solution. By adding hydrochloric acid to an aqueous solution of the coloring-matter the color of the solution becomes bluer, and a flocky precipitate is gradually separated, while the aqueous solution of the material at starting does not change on addition of hydrochloric acid.

What I claim as my invention, and wish to secure by Letters Patent, is—

A new article of manufacture, the herein-described rhodamin dye derived from formic aldehyde and the ethyl ether of the unsymmetrical dimethyl-methylrhodamin resulting from the condensation of dimethylamidoöxybenzoylbenzoic acid with metaämidoparacresol ($CH_3:NH_2:OH=1:2:4$), the said rhodamin dye dyeing tannin-mordanted cotton in fiery-red tints bluer than those obtained with the said ether and constituting in the form of its hydrochloric salt and in dry state a red-brown powder, which is soluble in hot water with a crimson-red tint showing no fluorescence and dissolves in concentrated sulfuric acid with an orange tint, which turns to crimson red by addition of water, while by adding hydrochloric acid to its aqueous solution, this latter becomes bluer and deposes gradually a flocky precipitate.

In witness whereof I have hereunto signed my name, this 17th day of November, 1899, in the presence of two subscribing witnesses.

JOHANN JAKOB BRACK.

Witnesses:
GEORGE GIFFORD,
AMAND RITTER.